(12) United States Patent
Horowitz

(10) Patent No.: US 10,040,470 B1
(45) Date of Patent: Aug. 7, 2018

(54) FOLDING WAGON HAVING A REMOVABLE CANOPY AND DETACHABLE CANOPY SUPPORT MEANS

(71) Applicant: Brian Horowitz, Lake Forest, CA (US)

(72) Inventor: Brian Horowitz, Lake Forest, CA (US)

( * ) Notice: Subject to any disclaimer, the term of this patent is extended or adjusted under 35 U.S.C. 154(b) by 0 days.

(21) Appl. No.: 15/902,621

(22) Filed: Feb. 22, 2018

(51) Int. Cl.
| | |
|---|---|
| *B62B 3/02* | (2006.01) |
| *B62B 5/00* | (2006.01) |
| *B62B 9/14* | (2006.01) |
| *B62B 3/00* | (2006.01) |
| *B62B 5/06* | (2006.01) |

(52) U.S. Cl.
CPC ............ *B62B 5/0013* (2013.01); *B62B 3/007* (2013.01); *B62B 3/025* (2013.01); *B62B 9/142* (2013.01); *B62B 5/06* (2013.01)

(58) Field of Classification Search
CPC ......... B62B 5/06; B62B 5/0013; B62B 3/025; B62B 3/007; B62B 9/142
See application file for complete search history.

(56) References Cited

U.S. PATENT DOCUMENTS

| | | | | |
|---|---|---|---|---|
| 6,079,777 | A * | 6/2000 | Simmons | A47C 1/143 |
| | | | | 108/157.17 |
| 6,260,566 | B1 * | 7/2001 | LaFave | B62J 17/08 |
| | | | | 135/88.01 |
| 6,263,893 | B1 | 7/2001 | Spinella et al. | |
| 6,390,431 | B1 * | 5/2002 | Ott | A45C 13/00 |
| | | | | 248/229.23 |
| 7,625,033 | B2 * | 12/2009 | Michelau | B62B 9/147 |
| | | | | 135/119 |
| 7,703,795 | B2 * | 4/2010 | Williamson | A01K 97/10 |
| | | | | 280/40 |
| 8,011,686 | B2 | 9/2011 | Chen et al. | |
| 8,220,824 | B2 | 7/2012 | Chen et al. | |
| 8,388,015 | B2 | 3/2013 | Chen et al. | |
| 9,085,311 | B1 * | 7/2015 | Chen | B62B 3/007 |
| 9,145,154 | B1 * | 9/2015 | Horowitz | B62B 3/025 |
| 9,376,133 | B2 * | 6/2016 | Sun | B62B 9/24 |
| 9,771,093 | B2 | 9/2017 | Horowitz | |
| 9,815,355 | B2 * | 11/2017 | Byrne | B60J 7/106 |
| 9,861,087 | B1 * | 1/2018 | Arrazola | A01K 97/10 |
| 2010/0090444 | A1 * | 4/2010 | Chen | B62B 3/007 |
| | | | | 280/651 |

(Continued)

*Primary Examiner* — Brian L Swenson
(74) *Attorney, Agent, or Firm* — Morland C. Fischer

(57) ABSTRACT

Disclosed is a folding wagon having a frame that is folded from an expanded configuration at which a variety of articles are carried in a basket to a compact collapsed configuration at which to facilitate the storage or transport of the wagon. A removable canopy is held above the basket by a plurality of hollow mounting posts that are pivotally connected to respective corner brackets mounted on the frame and a corresponding plurality of telescoping canopy support rods that engage the canopy and slide through the hollow mounting posts to adjust the distance between the canopy and the basket. The canopy support rods are disengaged from the canopy to separate the canopy from the wagon, and the pluralities of mounting posts and canopy support rods are rotatable together relative to the wagon frame between a first position standing upwardly from the basket and a second position lying alongside the basket.

20 Claims, 7 Drawing Sheets

(56) References Cited

U.S. PATENT DOCUMENTS

2014/0284443 A1* 9/2014 Forbes .................... G09F 21/04
248/313
2015/0151771 A1* 6/2015 Jin .......................... B62B 3/027
280/651

* cited by examiner

FOLDING WAGON HAVING A REMOVABLE CANOPY AND DETACHABLE CANOPY SUPPORT MEANS

BACKGROUND OF THE INVENTION

1. Field of the Invention

This invention relates to a folding wagon that is capable of being folded from an expanded open configuration at which a variety of articles or small children are carried in a basket of the wagon to a compact collapsed configuration at which to facilitate the storage or transport of the wagon when it is not being used. A removable canopy is held above the basket by means of hollow canopy mounting posts that are pivotally and detachably connected to respective corner brackets of the wagon and telescoping canopy support rods that extend from the canopy to be slidably received through the hollow canopy mounting posts so as to adjust the distance between the canopy and the basket.

2. Background Art

Wagons are known which are capable of being folded between open and collapsed configurations. Some folding wagons have a fabric basket that is sized to carry a variety of articles or small children when the wagon is unfolded for use in its open configuration. One example of such a folding wagon is available by referring to my U.S. Pat. No. 9,145,154 entitled FOLDING WAGON which issued Sep. 29, 2015.

My patented folding wagon has a removable canopy that is held above the basket by upstanding telescoping canopy support rods that are slidably received downwardly through hollow elbow joints located at corners of the wagon so that the telescoping rods can be disengaged from the canopy to permit the canopy to be removed from the wagon. In this case, the telescoping rods are always carried by the wagon whether or not the canopy is held above the basket. To maximize the applications and advantages of my patented wagon, it would be desirable to be able to either move the canopy support rods out of the way or completely remove the canopy support rods from the wagon along with the canopy. In this same regard, it would also be desirable to be able to substitute other useful articles for transport by the wagon after the canopy support rods and the canopy have been removed therefrom.

SUMMARY OF THE INVENTION

In general terms, disclosed herein is a folding wagon which includes a flexible basket and an overhead canopy that is removably attached to the wagon to cover the open top of the basket. The folding wagon is pulled at a handle in order to transport a variety of articles and/or small children that are located in the wagon basket. The folding wagon also includes a frame having a basket support rack upon which the wagon basket is seated and supported. The frame is adapted to be folded so that the wagon is correspondingly folded from an expanded open configuration during use to a compact collapsed configuration to facilitate transport and/or storage of the wagon when it is not in use. The wagon includes pairs of front and rear wheels attached to the wagon frame to roll over a surface in response to a pulling or a pushing force being applied to the wagon handle.

The removable overhead canopy is held above the basket of the folding wagon by means of upstanding hollow canopy mounting posts and telescoping canopy support rods. One end of each canopy mounting post is pivotally and detachably connected by a removable fastener to a corner of the wagon frame within a coupling channel of a respective corner bracket. One end of each telescoping canopy support rod is removably received within a corner pocket of the overhead canopy to hold the canopy in place. The opposite end of the telescoping support rod is slidably received through the opposite end of a corresponding one of the hollow canopy mounting posts to adjust the distance between the canopy and the basket.

When it is desirable to remove the overhead canopy from the wagon, the canopy support rods are first removed from the corner pockets of the canopy and pushed downwardly through the hollow canopy mounting posts. The mounting posts may then be rotated relative to the corner brackets to which they are pivotally connected through an angle of at least 180° from a first position standing upwardly from the wagon frame at which to lie above the wagon basket when the canopy is being held in place to a second position lying adjacent the sides of the wagon basket when the canopy is removed from the wagon. In their second position, the mounting posts are rotated into removable receipt by coupling clips that are attached to opposite sides of the wagon frame.

In the alternative, the canopy mounting posts with the telescoping canopy support rods being slidably received therewithin may be disconnected from the wagon. In this case, the fasteners by which the mounting posts are pivotally and detachably connected to respective corner brackets are removed, and the mounting posts are withdrawn from the coupling channels of the coupling brackets. A variety of useful articles may then be substituted for the canopy mounting posts. By way of example only, such useful articles include, but are not limited to, a cup holder, a fishing rod carrying sleeve and a frame at which a utility basket is carried. More particularly, each article has a coupling tab, or the like, extending therefrom to be removably received within the coupling channel of a corresponding corner bracket. The aforementioned fastener is moved through the corner bracket and a coupling hole formed in the coupling tab, whereby the coupling tab and the article associated therewith are pivotally and detachably connected to the corner bracket of the wagon frame.

DESCRIPTION OF THE PREFERRED EMBODIMENT

Figure 1:
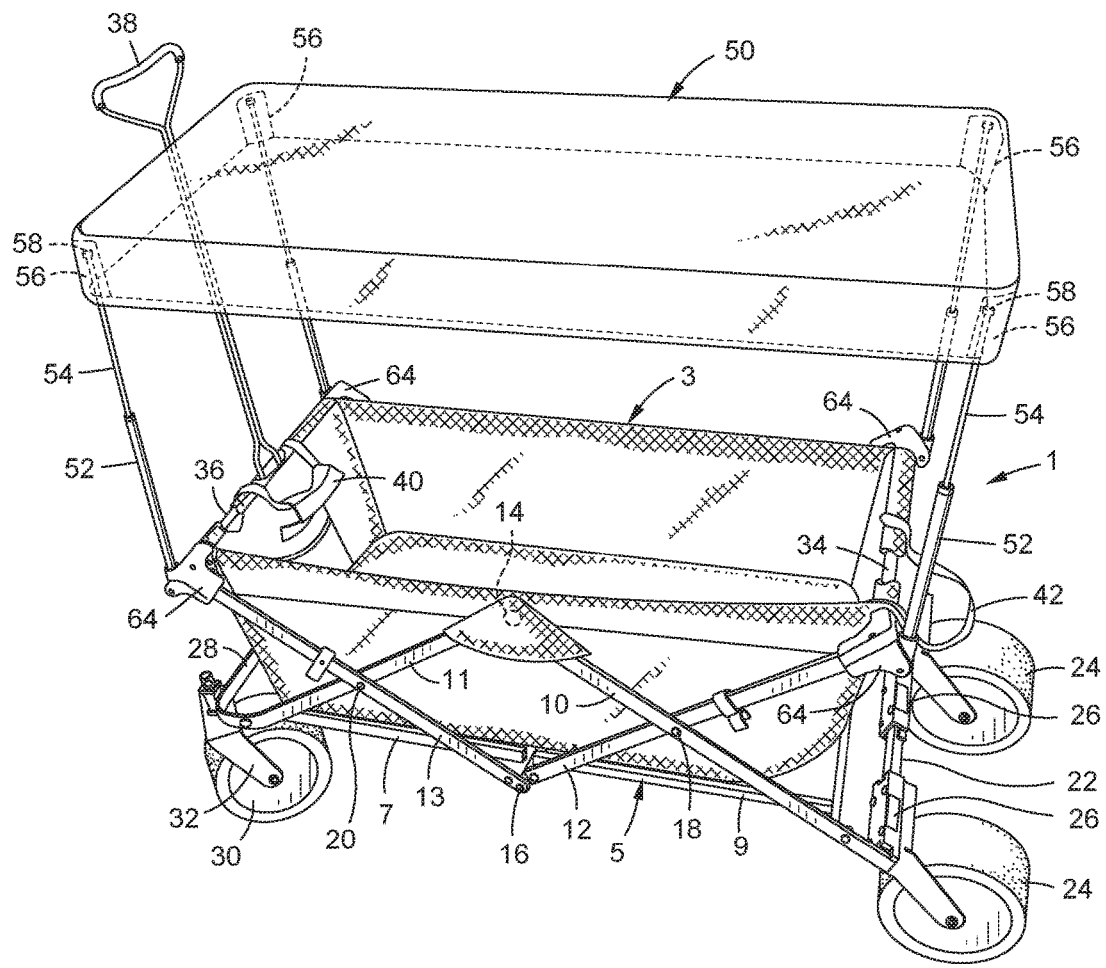
FIG. 1 shows a folding wagon having a flexible basket, a collapsible frame, a removable overhead canopy, and upstanding canopy mounting posts pivotally and detachably connected to the frame for holding the canopy above the basket.

Referring initially to FIG. 1 of the drawings, there is shown an improved folding wagon 1 that is adapted to be folded between an expanded open configuration during use and a compact collapsed configuration at which to facilitate its storage or transport when not in use. Folding wagons like that shown in FIG. 1 are known. For example, reference can be made to my U.S. Pat. No. 9,145,154 which shows and describes one example of a folding wagon of the kind in which the improvements to be described below can be incorporated. Therefore, the teachings of my patent are hereby incorporated herein by reference, and only a brief description of the folding wagon 1 will be provided below.

The folding wagon 1 includes a fabric basket 3 within which to carry a variety of articles including, but not limited to, sporting and camping goods, picnic supplies, business inventory and even small children. The fabric basket 3 is open at the top and closed along the bottom, front, rear and sides. The basket 3 sits upon and is supported by a rectangular folding frame which includes a flat basket support rack 5 that lies at the bottom of the wagon 1. The basket support rack 5 has opposite ends 7 and 9 that are pivotally connected together and capable of being rotated towards one another so as to lie face-to-face (not shown) in response to an uplifting pulling force applied thereto when the wagon is being folded to its compact collapsed configuration.

However, it is to be understood that the advantages of this invention that will be described in greater detail hereinafter are also applicable to wagons which do not fold. In that case, the basket support rack 5 will remain flat such that the opposite ends 7 and 9 thereof remain stationary and will not rotate towards and away from one another.

The rectangular folding frame of the folding wagon 1 that is shown in FIG. 1 is folded to enable the wagon to be correspondingly folded from its expanded open configuration of FIG. 1 at which articles are carried in the basket 3 to its compact collapsed configuration (shown in FIG. 10) at which the basket 3 is collapsed upon itself and the wagon is suitable for transport or storage. Prior to it being folded, the folding frame also holds the basket 3 up so as to be seated on and supported by the basket support rack 5. Reference may also be made to my aforementioned U.S. Pat. No. 9,145,154 for details to explain the attachment of the basket 3 to the folding wagon frame so that the basket 3 is held above the basket support rack 5.

Briefly, each side of the wagon frame which lies along one side of the wagon basket 3 is identical and includes a first pair of diagonally extending side support arms 10 and 11 and a second pair of diagonally extending side support arms 12 and 13. The first pair of diagonal side support arms 10 and 11 are connected to one another at first ends thereof by means of an upper pivot coupling 14, so that the support arms 10 and 11 project upwardly to make an angle of about 90 degrees. The second pair of diagonal side support arms 12 and 13 are also connected to one another at first ends thereof by means of a lower pivot coupling 16, so that the support arms 12 and 13 project downwardly to make an angle of about 90 degrees. The diagonally extending side support arms 10 and 12 are coupled to one another about midway between the first and opposite ends thereof by means of a pivot coupling 18, and the diagonally extending side support arms 11 and 13 are coupled to one another about midway between the first and opposite ends thereof by means of a pivot coupling 20.

The opposite end of the side support arm 10 of the first pair of side support arms 10 and 11 is connected to one end of a rear wheel support track 22. The rear wheel support track 22 is spaced from and located behind the basket support rack 5 at which a pair of rear wheels 24 of the folding wagon 1 are mounted. Each rear wheel 24 is attached to a collar 26 that surrounds and is slidable back and forth along the rear wheel support track 22. The collars 26 slide towards one another so that the rear wheels 24 move together to enable the wagon 1 to be folded into its compact collapsed configuration.

The opposite end of the side support arm 11 of the first of the pair of side support arms 10 and 11 of the wagon frame bends continuously around the front of the folding wagon 1 at which to form a front wheel support track 28. The front wheel support track 28 is spaced from and located ahead of the basket support rack 5 at which a pair of front wheels (only one of which 30 being shown) of the folding wagon 1 are mounted. Each front wheel 30 is fixedly connected to the front wheel support track 28 by means of a pivotal front wheel bracket 32.

A horizontal extension 34 of the side support arm 12 of the second pair of side support arms 12 and 13 of the wagon frame bends continuously around the rear of the folding wagon 1. The rear of the basket 3 is folded over and around the extension 34 of the side support arm 12 to help hold the basket 3 up so as to stand above the basket support rack 5 when the wagon 1 is in its expanded open configuration.

Likewise, a horizontal extension 36 of the side support arm 13 of the second pair of side support arms 12 and 13 bends continuously around the front of the folding wagon 1. The front of the basket 3 is folded over and around the extension 36 of the side support arm 13 to help hold the basket 3 up so as to stand above the basket support rack 5 when the wagon is in its expanded open configuration.

A wagon transport handle 38 is pivotally connected to the basket support extension 36 at the front of the folding wagon 1. A pulling force or a pushing force is applied to the wagon transport handle 38 by a user to cause the pairs of rear and front wheels 24 and 30 to roll over a surface by which the wagon 1 can be transported from place-to-place in a forward or backward direction. Flexible U-shaped wagon retention handles 40 and 42 are attached to and extend outwardly from the front and the rear of the basket 3. The wagon retention handles 40 and 42 can be mated to one another so as to hold the wagon 1 in its closed configuration standing upright on the ground (not shown). In the case where the folding wagon 1 is folded to its compact closed configuration, the pairs of front and rear wheels 30 and 24 are moved side-by-side one another on the ground, and the wagon transport handle 38 is rotated downwardly to lie on the ground, so that a stand is created for holding the folded wagon upright on the ground.

As in the case of the folding wagon described in my aforementioned U.S. Pat. No. 9,145,154, the improved folding wagon 1 shown in FIG. 1 includes a rectangular overhead fabric canopy 50 that is adjustably and removably attached to the wagon 1 so as to be held above the open top of the basket 3. However, the previous means by which the canopy 50 is removably attached to the wagon 1 has been changed to achieve important advantages which will now be described.

More particularly, the canopy 50 is removably attached to the folding wagon 1 by canopy mounting means, each of which including a hollow, rotatable and relatively wide cylindrical canopy mounting post 52 and a relatively narrow telescoping canopy support rod 54 that is slidably received by the mounting post 52. A combination canopy mounting post 52 and telescoping canopy support rod 54 is located at each of the four corners of the frame of the folding wagon 1. That is, a telescoping canopy support rod 54 from each combination is located above the wagon basket 3 to be removably received at one of the four corners of the rectangular canopy 50, and a hollow canopy mounting post 52 through which a telescoping rod 54 is slidable is pivotally coupled to one corner of the wagon frame.

Referring concurrently in this regard to FIGS. 1-6 of the drawings, the overhead rectangular canopy 50 is shown in FIG. 1 having a pocket 56 located at each corner thereof. Each telescoping canopy support rod 54 has a relatively wide coupling head 58 located at its top. The opposite bottoms of the coupling rods 54 are received within the open tops of and slidable through respective hollow canopy mounting posts 52 that are pivotally coupled to the four corners of the wagon frame. The coupling heads 58 at the tops of the telescoping rods 54 are received within respective pockets 56 located at the four corners of the removable canopy 50 (best shown in FIG. 1), whereby to hold the canopy in place above the basket 3 of the wagon 1.

Figure 2:
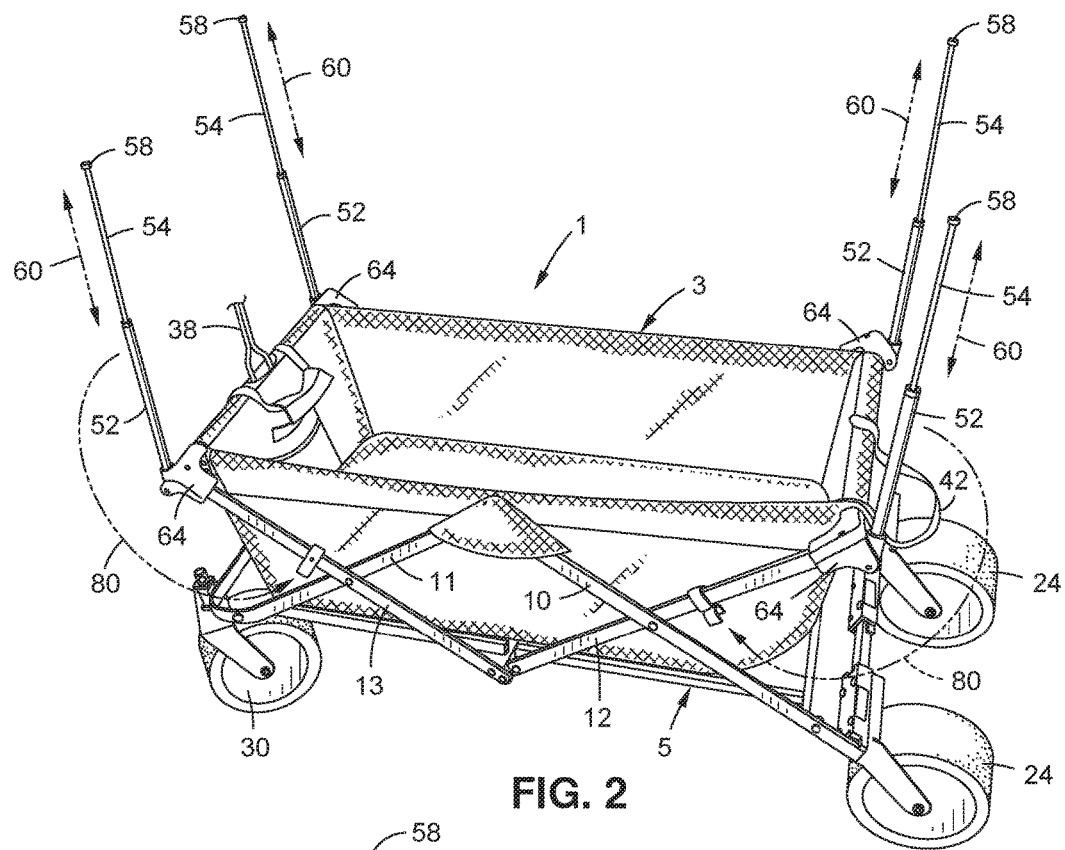
FIG. 2 shows the folding wagon of FIG. 1 without the overhead canopy and with telescoping canopy support rods extending upwardly from respective canopy mounting posts at which to engage the canopy.
Figures 3, 4:
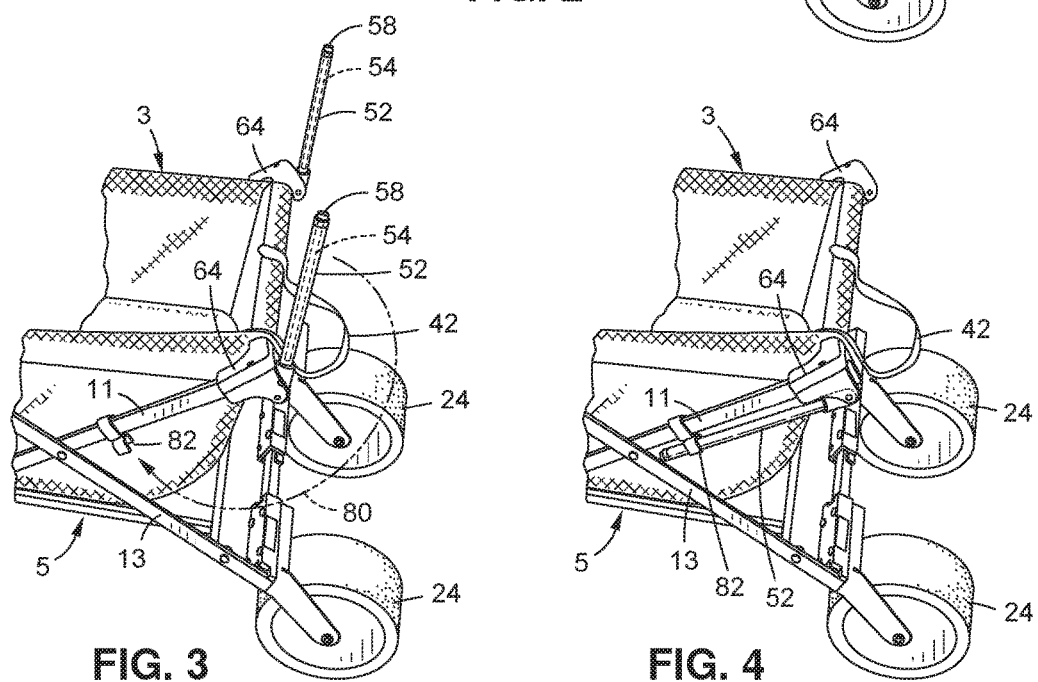
FIG. 3 shows a detail of the folding wagon of FIG. 2 with the telescoping canopy support rods being slidably received downwardly through respective ones of the canopy mounting posts.
FIG. 4 shows the wagon detail of FIG. 3 with the canopy mounting posts rotated so as to lie alongside the wagon basket and held in place by coupling clips attached to the collapsible frame of the folding wagon.

The telescoping canopy support rods 54 are slidable vertically and in opposite directions (represented by the reference arrows 60 shown in FIG. 2) through the canopy mounting posts 52 to correspondingly adjust the distance between the canopy 50 and the top of the wagon basket 3. With the telescoping rods 54 fully extended upwardly from the mounting posts 52 as shown in FIG. 2, the distance between the canopy 50 and the basket 3 of the wagon 1 is maximized. With the telescoping rods 54 pushed downwardly to slide completely through the mounting posts 52 as shown in FIG. 3, the distance between the canopy 50 and the basket 3 of the wagon 1 is minimized. In this case, the coupling heads 58 at the tops of the telescoping rods 54 can be disengaged and removed from the corner pockets 56 of the canopy 50 by which the canopy can be removed from wagon 1.

As just described, the open tops of the hollow canopy mounting posts 52 receive respective ones of the telescoping rods 54 therethrough. The opposite bottoms of the mounting rods 52 are pivotally connected to and stand upwardly from respective corners of the frame of the wagon 1 by means of a plurality of (e.g., four) corner brackets 64. Referring specifically in this regard to FIGS. 5 and 6 of the drawings, one of the plurality of corner brackets 64 is shown having a top 66 and a detachable bottom 68 lying one above the other. The bottom 68 of corner bracket 64 is configured to receive therewithin the continuously extending intersection of one of the diagonally extending second pair of side support arms (e.g., 13) of the wagon frame and the extension 36 thereof that runs horizontally across the front of the folding wagon 1 to hold up the basket 3 (best shown in FIG. 1).

The bottom 68 of the corner bracket 64 has a coupling channel 70 formed therethrough. A pair of axially aligned holes 72 are spaced from one another through the bottom 68 of bracket 64 at opposite ends of the coupling channel 70. A coupling collar 74 surrounds the bottom of the hollow canopy mounting post 52 within which one of the telescoping canopy support rods (e.g., designated 54 in FIG. 1) is slidably received. A coupling hole 76 extends laterally and completely through the bottom of the mounting post 52 and the coupling collar 74 that surrounds the mounting post 52.

Figure 5:
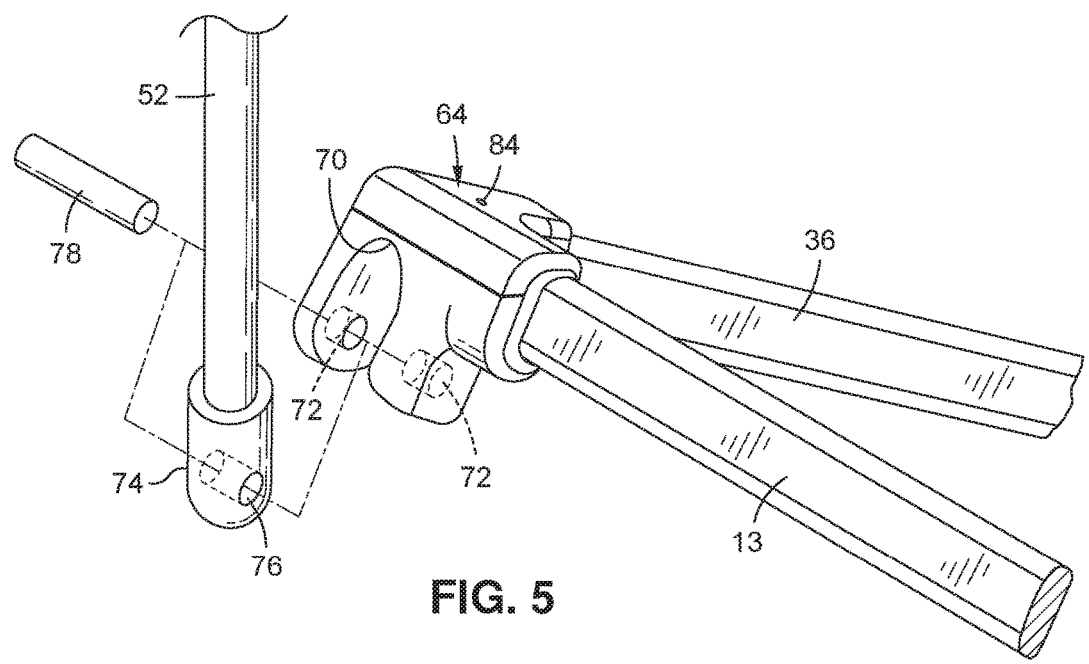
FIG. 5 illustrates the pivotal and detachable connection of one of the canopy mounting posts to a respective corner bracket that is attached to one corner of the collapsible frame of the folding wagon.

The canopy mounting post 52 shown in FIG. 5 is pivotally coupled to a front corner of the rectangular frame of the folding wagon 1 of FIG. 1 by locating the coupling collar 74 of mounting post 52 within the coupling channel 70 formed through the bottom 68 of the corner bracket 64. A removable coupler 78 (such as a pin, a fastener or the like) is moved through each of the opposing holes 72 of the bracket 64 and the coupling hole 76 of the coupling collar 76 that is located between the holes 72 and axially aligned therewith. Accordingly, the canopy mounting post 52 which receives therewithin a telescoping canopy support rod 54 may now be rotated (in one of the directions indicated by the reference arrows 80 of FIG. 2) between a first substantially vertical position standing upwardly from the front of the frame of the wagon 1, where the telescoping rod 54 can be slidably adjusted upwardly through the mounting post 52 in order to hold the canopy 50 above the basket 3 of wagon 1, and a second out of the way position so as to be located along one side of the basket 3 of wagon 1 below the open top thereof (best shown in FIG. 4) after the telescoping rod 54 is first pushed downwardly through the mounting post 52 and removed from its corner pocket 56 in the canopy 50 when it is desirable to separate the canopy from the wagon.

In the case where the canopy mounting post 52 is rotated downwardly to lie alongside the basket 3, and as is also best shown in FIG. 4, the mounting post 52 is held in place adjacent one of the diagonal side support arms (e.g., 11) of the wagon frame by means of a coupling clip 82 that is attached to the side support arm. That is, the canopy mounting post 52 is either pushed into removable receipt by the coupling clip 82 when the wagon 1 is used without its canopy 50 or detached from the coupling clip 82 when the mounting post 52 will be rotated to its vertically upstanding position (of FIG. 3) at which the telescoping canopy support rod 54 can be pulled outwardly from its mounting post 52 to be moved into engagement with canopy 50.

Figure 6:
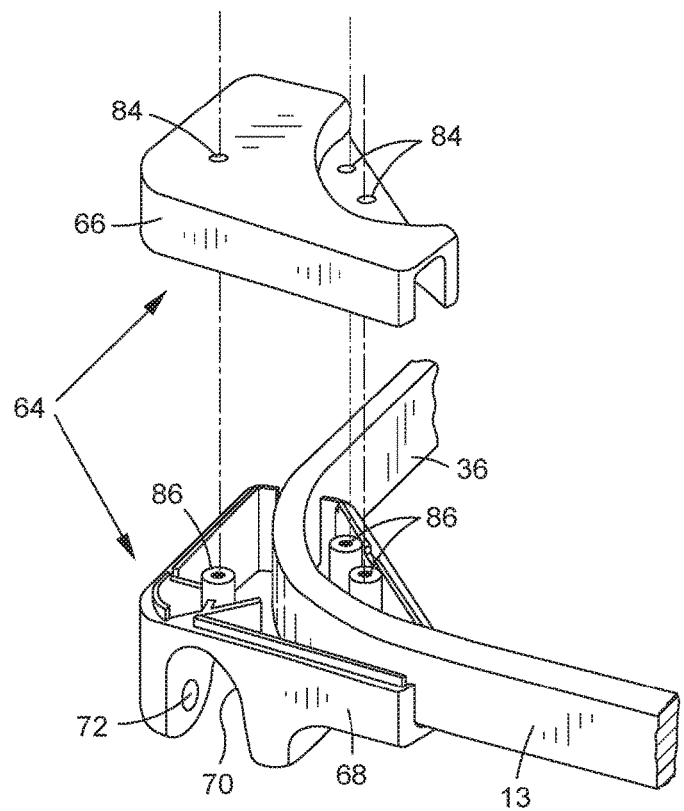
FIG. 6 is an exploded view of the corner bracket and the corner of the wagon frame shown in FIG. 5.

The assembly of the corner bracket 64 of FIGS. 5 and 6 is completed when the top 66 of bracket 64 is placed over the bottom 68 thereof so that attachment holes 84 formed through the top 66 of bracket 64 are aligned with attachment posts 86 standing upwardly from the bottom 68. Fasteners (not shown) are then moved through respective pairs of axially aligned attachment holes 84 and attachment posts 86 to hold the top 66 and bottom 68 of the corner bracket 64 together in surrounding engagement with the frontal extension of the side support arm 13 of the frame of wagon 1.

FIGS. 1-6 illustrate the folding wagon 1 having a removably canopy 50 to be held above a basket 3 by means of telescoping canopy support rods 54 that are slidably adjustable through rotating canopy mounting posts 52 that are pivotally connected to respective corner brackets 64. As an option, the canopy 50 can be removed from the wagon 1, and the mounting posts 52 and telescoping rods 54 that are carried thereby can be detached from the corner brackets 64 by withdrawing the couplers 78 from the axially aligned holes 72 and 76 which run through the bottoms 68 of the corner brackets 64 and the coupling collars 74 of the mounting posts 52.

Figure 7:
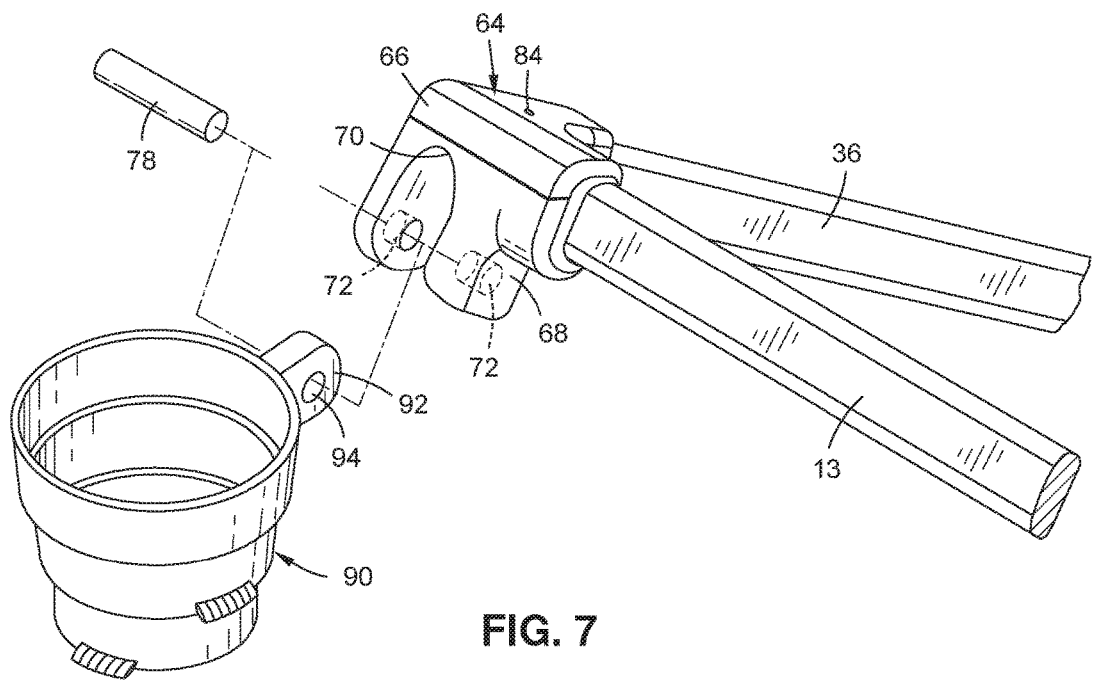
FIGS. 7 and 8 show a collapsible cup holder pivotally and detachably connected to a corresponding corner bracket at a corner of the collapsible frame of the folding wagon after the canopy mounting post of FIG. 5 has been detached from the corner bracket.
Figure 8:
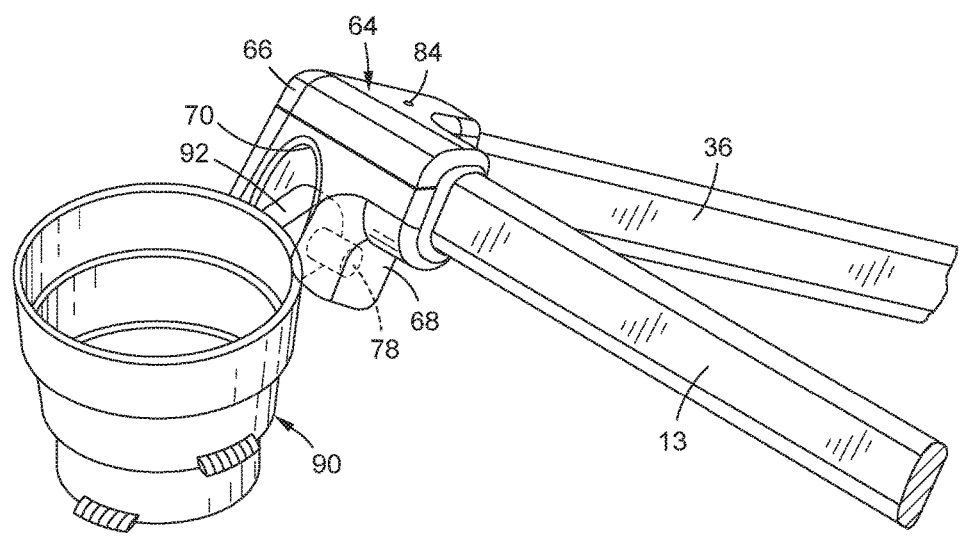

In this case, one or more of the corner brackets 64 that are located at corners of the rectangular frame of the folding wagon 1 can be advantageously used for a purpose other than for holding the overhead canopy 50 above the wagon basket 3. Referring in this regard to FIGS. 7 and 8 of the drawings, there is shown a cylindrically shaped collapsible cup holder 90 pivotally coupled to one of the corners of the frame of the folding wagon 1 by means of one of the previously described corner brackets 64. Because details of the corner bracket 64 were previously provided, identical reference numeral will be used to describe the alternate application of the bracket 64 illustrated in FIGS. 7 and 8.

The optional collapsible cup holder 90 is generally known and will typically be used for receiving and carrying a cup, a bottle or the like while the folding wagon 1 of FIG. 1 is either stationary or being rolled from place-to-place. The cup holder 90 is provided with a coupling tab 92 having a coupling hole 94 formed therein. The cup holder 90 is removably connected to a corner of the frame of the folding wagon 1 at a corner bracket 64 thereof by locating the coupling tab 92 of cup holder 90 within the coupling channel 70 of corner bracket 64 so that the coupling hole 94 formed in the coupling tab 92 is positioned between and axially aligned with the opposing pin holes 72 that are formed through the bottom 68 of bracket 64.

The aforementioned removable coupler 78 is now moved through the axially aligned holes 72 and 94 by which the collapsible cup holder 90 is pivotally and detachably connected to the corner bracket 64 of wagon 1. The cup holder 90 is disconnected from the wagon and separated from corner bracket 64 by withdrawing the coupler 78 and removing the coupling tab 92 of cup holder 90 from the coupling channel 70 of bracket 64.

Figure 9:
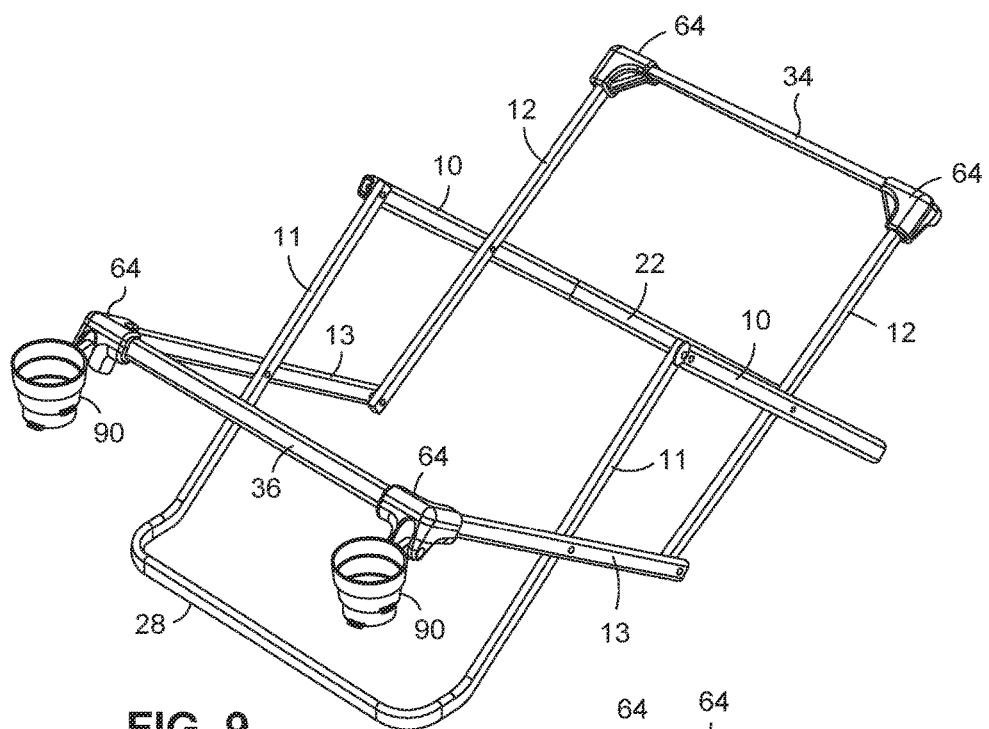
FIGS. 9 and 10 show a pair of collapsible cup holders pivotally and detachably connected to respective corner brackets at adjacent corners of the collapsible frame of the folding wagon when the frame is in an expanded open configuration and in a compact collapsed configuration.
Figure 10:
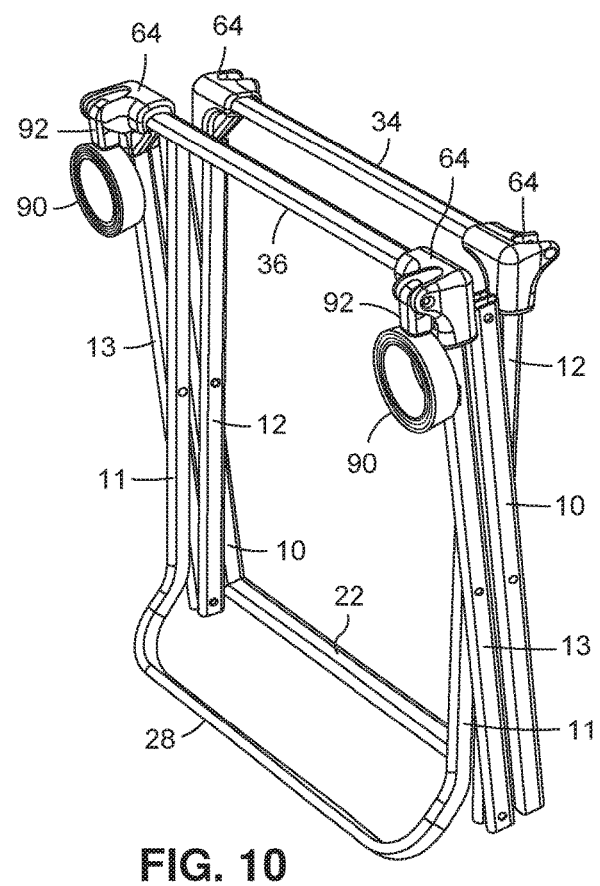

FIGS. 9 and 10 of the drawings show the folding wagon frame carrying a pair of the collapsible cup holders 90 of FIGS. 7 and 8 when the frame is in its expanded open configuration of FIG. 9 and in its compact collapsed configuration of FIG. 10. The pair of cup holders 90 are pivotally connected by couplers 78 (of FIG. 7) to respective corner brackets 64 located at corners of the wagon frame so as to extend horizontally from the wagon frame at which to receive and carry cups therewithin when the wagon frame is expanded and the first pairs of side support arms 10 and 11 are spaced from the second pair pairs of side support arms 12 and 13 as shown in FIG. 9. In this case, the collapsible cup holders 90 are expanded. When the wagon frame is collapsed into its compact package and the first pairs of side support arms 10 and 11 and the second pairs of side support arms 12 and 13 lie in generally vertical side-by-side alignment as shown in FIG. 10, the cup holders 90 are rotated at their coupling tabs 92 to extend vertically downward relative to the wagon frame and lie along the vertically extending side support arms 10-13 at which the cup holders 90 can now be collapsed.

Figure 11:
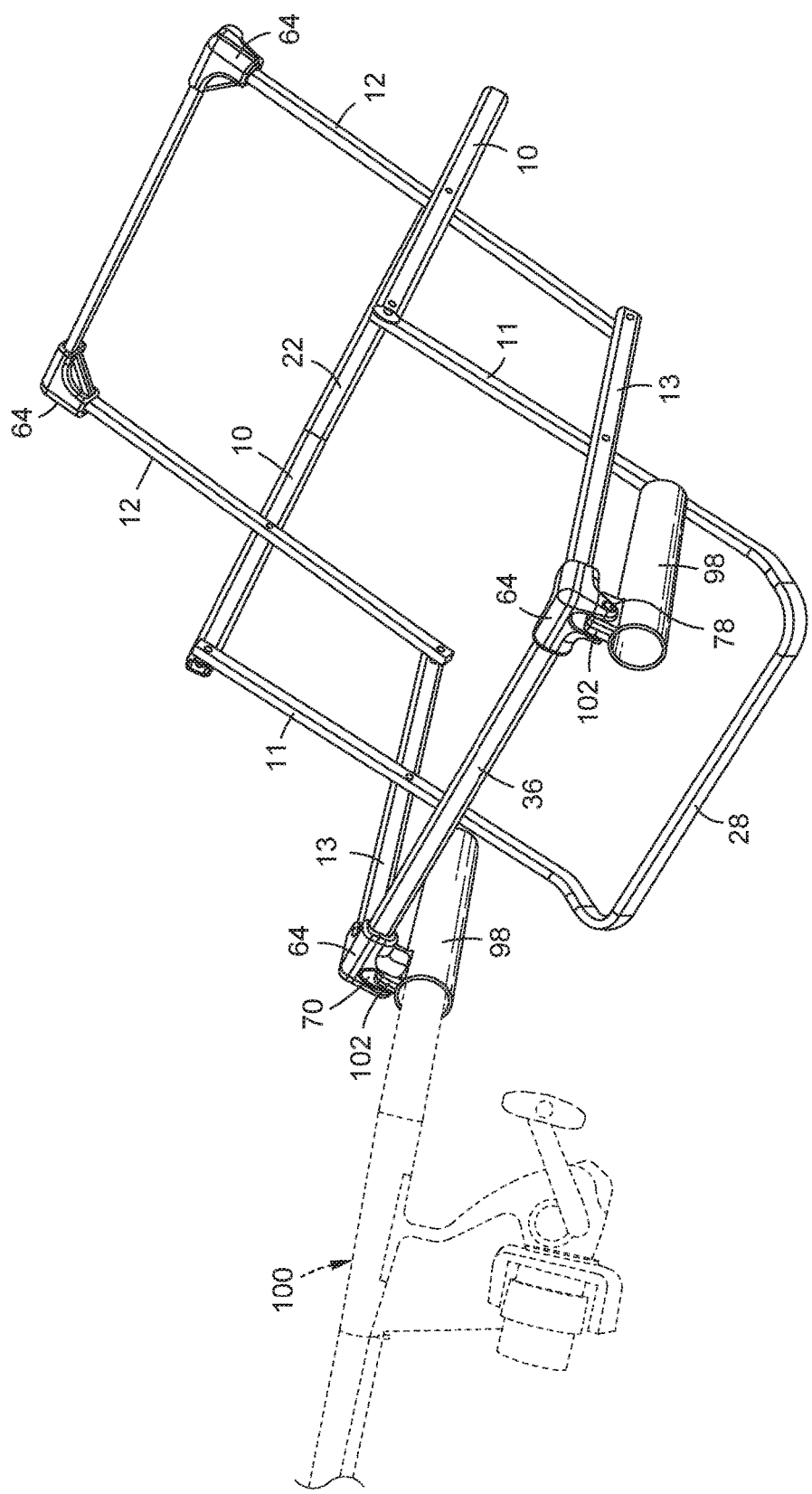
FIG. 11 shows a pair of tubular fishing rod carrying sleeves pivotally and detachably connected to respective corner brackets of the collapsible wagon frame after canopy mounting posts have first been removed therefrom.

Another option for using some or all of the identical, previously disclosed corner brackets 64 when the overhead canopy 50 of FIG. 1 has been removed from the folding wagon 1 is described while referring to FIG. 11 of the drawings. In this case, there is shown a pair of optional fishing rod carrying sleeves 98 pivotally coupled to respective corner brackets 64 that are attached to one end of the frame of the folding wagon 1. Each fishing rod carrying sleeve 98 has a tubular body that is sized and shaped to receive and surround the handle of a conventional fishing rod (shown in phantom lines and designated 100 in FIG. 11).

Like the collapsible cup holder 90 of FIGS. 7 and 8, each fishing rod carrying sleeve 98 of FIG. 11 is provided with a coupling tab 102 having a coupling hole (not shown) formed therein. The fishing rod carrying sleeve 98 is removably connected to a corresponding corner bracket 64 by locating the coupling tab 102 of the sleeve within the coupling channel 70 of the bracket 64 so that the coupling hole formed through the coupling tab 102 is positioned between and axially aligned with the opposing holes (designated 72 in FIG. 7) that are formed through bracket 64. The aforementioned coupler 78 (best shown in FIG. 7) is now moved through the axially aligned holes that are formed in bracket 64 and coupling tab 102 by which the fishing rod carrying sleeve 98 is pivotally connected to the corner bracket 64. Each fishing rod carrying sleeve 98 is disconnected from its corner bracket 64 and separated from the wagon by withdrawing the coupler 78 and removing the coupling tab 102 of the sleeve 98 from the coupling channel 70 of bracket 64.

Figure 12:
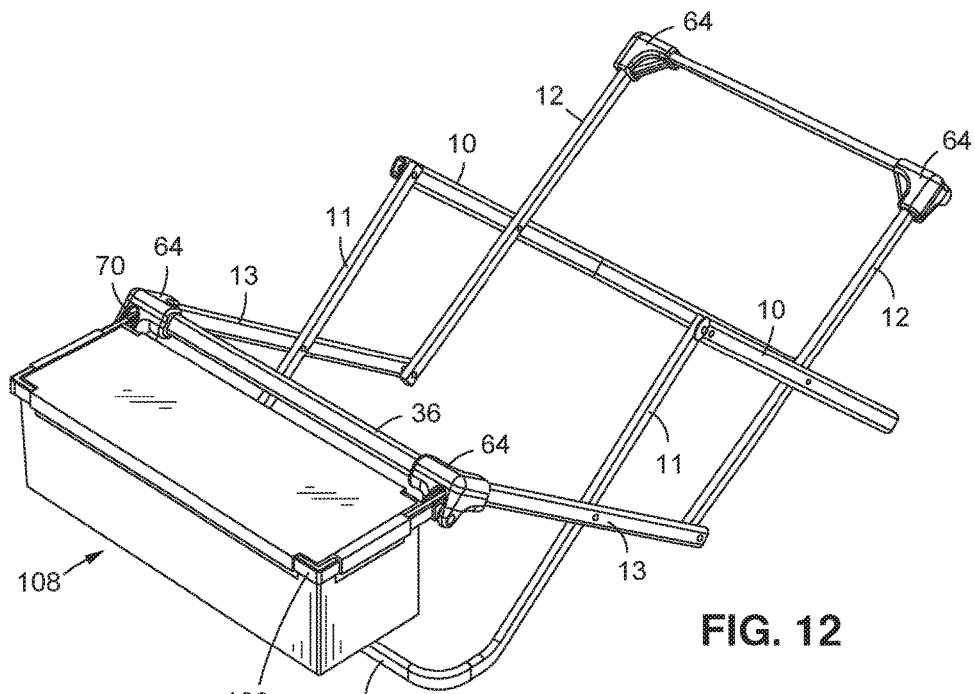
FIGS. 12 and 13 show a frame for a utility basket pivotally and detachably connected to a pair of corner brackets of the collapsible frame of the folding wagon when the frame is in its expanded open configuration and in its compact collapsed configuration.
Figure 13:
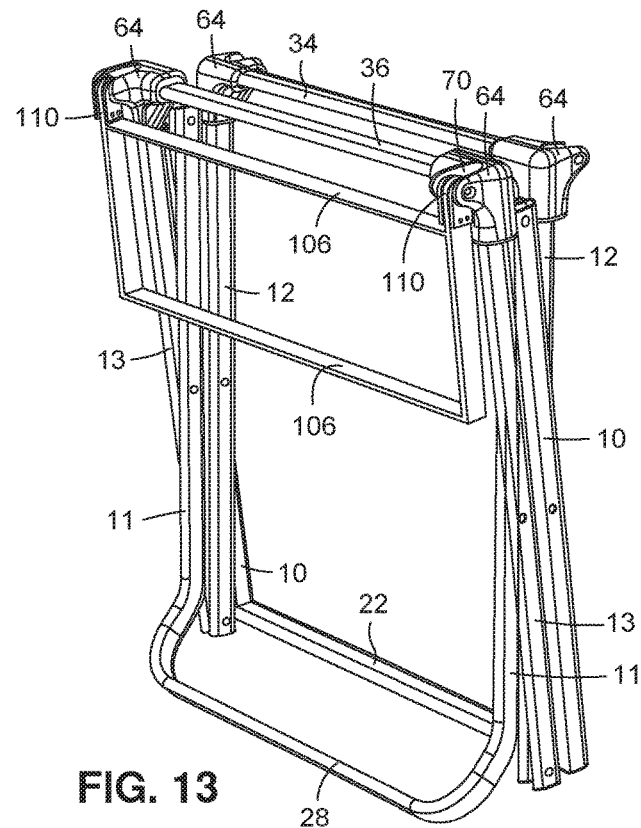

Yet another use for one or more of the identical, previously disclosed corner brackets 64 located at the corners of the frame of the folding wagon 1 is described while referring to FIGS. 12 and 13 of the drawings. In this example, an optional utility box or basket 108 is suspended from the wagon frame to be transported at one end (e.g., the front) of the folding wagon 1 of FIG. 1 after the overhead canopy has been removed therefrom. The utility basket 108 has a frame 106 which runs around and through the top thereof. A pair of frame arms 110 project from opposite sides of the basket frame 106 towards the wagon to be pivotally coupled to a respective pair of adjacent corner brackets 64.

Each one of the frame arms 110 of the basket frame 106 has a coupling hole (not shown) formed therein. The frame 106 of the utility basket 108 is removably connected to the frame of the wagon 1 by locating the frame arms 110 within coupling channels 70 of respective ones of the pair of corner brackets 64 so that the coupling hole that is formed through each frame arm 110 is positioned between and axially aligned with opposing holes (designated 72 in FIG. 7) that are formed through a corresponding bracket 64. A coupler (designated 78 and best shown in FIG. 7) is now moved through the axially aligned holes that are formed in each bracket 64 and one of the pair of frame arms 110 of the basket frame 106 by which the utility basket 108 is pivotally connected to the pair of corner brackets 64 that are located at an end (e.g., the front) of the wagon frame. More particularly, the basket frame 106 and the utility basket 108 carried thereby are rotatable relative to the pair of corner brackets 64 to which they are coupled between a horizontal position extending outwardly from the wagon frame when the folding wagon 1 is opened to its expanded configuration shown in FIG. 12 and a vertical position extending downwardly and lying alongside the wagon frame when the folding wagon 1 is folded to its compact collapsed configuration shown in FIG. 13.

The invention claimed is:

1. A wagon comprising:
   a frame;
   at least one wheel attached to the frame to enable the wagon to roll over a flat surface and move from place-to-place;
   a basket carried by the frame and having an open top at which to receive and transport a variety of articles;
   a removable overhead canopy lying above said basket; and
   a plurality of canopy mounting means pivotally coupled to said frame and being rotatable relative to said frame between a first position standing upwardly from said frame to lie above said basket at which to engage and hold said removable canopy over said basket and a second position lying alongside said basket below said open top thereof at which said plurality of mounting means are disengaged from said removable canopy and said canopy is removed from said wagon.

2. The wagon recited in claim 1, wherein said plurality of canopy mounting means stand upwardly from said frame in a generally vertical direction so as to lie above said basket at which to engage and hold said removable overhead canopy over said basket when said plurality of mounting means are located in said first position.

3. The wagon recited in claim 2, wherein said plurality of canopy mounting means rotate relative to said frame through an angle of at least 180° when said canopy mounting means are rotated between said first position standing vertically upward from said frame so as to lie above said basket and said second position lying alongside said basket.

4. The wagon recited in claim 1, wherein at least one of said plurality of canopy mounting means includes a hollow canopy mounting post detachably connected to said frame and a telescoping canopy support rod having a first end engaging said removable overhead canopy and an opposite end received by and slidable through said hollow canopy mounting post to adjust the distance between said overhead canopy and said basket.

5. The wagon recited in claim 4, further comprising a bracket attached to said frame, the hollow canopy mounting post of the at least one of said plurality of canopy mounting means being detachably connected and pivotally coupled to said frame at said bracket by means of a coupler that runs through each of said bracket and said mounting post such that said one canopy mounting means is rotatable relative to said bracket between said first and second positions.

6. The wagon recited in claim 5, further comprising a coupling clip attached to said frame, wherein the hollow canopy mounting post of the at least one of said plurality of canopy mounting means is rotated into removable receipt of and held in place by said coupling clip when said one canopy mounting means is rotated relative to said bracket to said second position lying alongside said basket.

7. The wagon recited in claim 5, wherein the frame of said wagon is rectangular and has four corners, said bracket being attached to said frame in surrounding engagement with one of the four corners thereof.

8. The wagon recited in claim 5, wherein the first end of said canopy support rod is adapted to be disengaged from said removable overhead canopy and wherein said coupler is removable from each of said bracket and said hollow canopy mounting post, whereby said canopy mounting post is disconnected from said frame and separated from said wagon.

9. The wagon recited in claim 1, wherein said basket is flexible and said frame is collapsible by which said wagon is folded between an expanded configuration at which said frame is outstretched horizontally and a compact configuration at which said frame is collapsed vertically upon itself.

10. A wagon comprising:
    a frame;
    at least one wheel attached to the frame to enable the wagon to roll over a flat surface and move from place-to-place;
    a basket carried by the frame in which to receive and transport a variety of articles;
    a removable overhead canopy lying above said basket;
    a plurality of canopy mounting means detachably connected to said frame and extending between said frame and said removable overhead canopy to engage and hold said canopy over said basket, said plurality of canopy mounting means adapted to be disconnected from said frame and disengaged from said removable overhead canopy, whereby said canopy is separated from said wagon, at least one of said plurality of canopy mounting means including a hollow canopy mounting post at which said at least one canopy mounting means is detachably connected to said frame and a telescoping canopy support rod having a first end engaging said removable overhead canopy and an opposite end received by and slidable through said hollow canopy mounting post to adjust the distance between said overhead canopy and said basket; and
    a bracket connected to said frame, said hollow canopy mounting post detachably connected to said bracket so that said at least one canopy mounting means is detachably connected to said frame by way of said bracket.

11. The wagon recited in claim 10, wherein said bracket has a coupling channel formed therein and said hollow canopy mounting post is removably received within said coupling channel, said wagon further comprising a removable coupler extending through each of the coupling channel of said bracket and the canopy mounting post received therewithin such that said at least one canopy mounting means is detachably connected to said frame.

12. The wagon recited in claim 10, further comprising a cup holder and a bracket connected between said cup holder and said frame so that said cup holder is attached to and carried by said wagon.

13. The wagon recited in claim 12, further comprising a coupler, and wherein said cup holder has a coupling tab extending therefrom and a coupling hole formed in said coupling tab, said coupler being received through said bracket and the coupling hole formed in the coupling tab of said cup holder, such that said cup holder is pivotally connected to said bracket by said fastener and rotatable relative to said frame.

14. The wagon recited in claim 10, further comprising a fishing rod holder and a bracket connected between said fishing rod holder and said frame so that said fishing rod holder is attached to and carried by said wagon.

15. The wagon recited in claim 14, further comprising a coupler, and wherein said fishing rod holder has a tubular body with a coupling tab extending therefrom and a coupling hole formed in said coupling tab, said coupler being received through said bracket and the coupling hole formed in the coupling tab of said fishing rod holder, such that said fishing rod holder is pivotally connected to said bracket by said fastener and rotatable relative to said frame.

16. A wagon comprising:

a frame;

at least one wheel attached to the frame to enable the wagon to roll over a flat surface and move from place-to-place;

a basket having an open top and being carried by the frame in which to receive and transport a variety of articles;

a removable overhead canopy lying above said basket;

a plurality of canopy mounting means being pivotally coupled and detachably connected to said frame and extending from said frame to said removable overhead canopy, said plurality of canopy mounting means being rotatable relative to said frame between a first position standing upwardly from said frame to lie above said basket at which to engage and hold said removable canopy over said basket and a second position to lie below the open top of said basket at which said plurality of canopy mounting means are adapted to be disconnected from said frame and disengaged from said removable overhead canopy, whereby said canopy is separated from said wagon;

a utility basket;

a utility basket frame to which said utility basket is attached, said utility basket frame having a pair of frame arms lying opposite one another and running along the sides of said utility basket; and a pair of brackets connected between respective ones of the pair of frame arms of said utility basket frame and the frame of said wagon so that said utility basket frame and said utility basket attached thereto are connected to and carried by said wagon.

17. The wagon recited in claim 16, wherein at least one of said plurality of canopy mounting means includes a hollow canopy mounting post detachably connected to said frame and a telescoping canopy support rod having a first end to releasably engage said removable overhead canopy and an opposite end received by and slidable through said hollow canopy mounting post to adjust the distance between said overhead canopy and said basket carried by said frame.

18. The wagon recited in claim 17, further comprising a bracket connected to said frame, said hollow canopy mounting post detachably connected to said bracket so that said at least one canopy mounting means is detachably connected to said frame by way of said bracket.

19. The wagon recited in claim 18, wherein said bracket has a coupling channel formed therein and said hollow canopy mounting post is removably received within said coupling channel, said wagon further comprising a removable coupler extending through each of the coupling channel of said bracket and the canopy mounting post received therewithin such that said at least one canopy mounting means is detachably connected to said frame.

20. A wagon comprising:

a frame;

at least one wheel attached to the frame to enable the wagon to roll over a flat surface and move from place-to-place;

a basket carried by the frame in which to receive and transport a variety of articles;

a removable overhead canopy lying above said basket; and a plurality of canopy mounting means being pivotally coupled and detachably connected to said frame and extending from said frame to said removable overhead canopy, said plurality of canopy mounting means being rotatable relative to said frame between a first position standing upwardly from said frame to lie above said basket to engage and hold said removable canopy over said basket and a second position to lie below said first position at which said plurality of canopy mounting means are adapted to be disconnected from said frame and disengaged from said removable overhead canopy, whereby said canopy is separated from said wagon.

\* \* \* \* \*